US007747529B2

(12) United States Patent
Homoki

(10) Patent No.: US 7,747,529 B2
(45) Date of Patent: Jun. 29, 2010

(54) METHOD AND SYSTEM OF CHECK PRESENTATION

(76) Inventor: David J. Homoki, 1301 Groveland Ter., El Cajon, CA (US) 92021

( * ) Notice: Subject to any disclaimer, the term of this patent is extended or adjusted under 35 U.S.C. 154(b) by 1067 days.

(21) Appl. No.: 11/373,550

(22) Filed: Mar. 10, 2006

(65) Prior Publication Data

US 2007/0214086 A1    Sep. 13, 2007

(51) Int. Cl.
  *G06Q 40/00* (2006.01)
  *G07D 11/00* (2006.01)
(52) U.S. Cl. ......................................... 705/45; 235/379
(58) Field of Classification Search .............. 705/35–42
  See application file for complete search history.

(56) References Cited

U.S. PATENT DOCUMENTS

| 5,679,938 | A | 10/1997 | Templeton et al. |
| 6,243,689 | B1 * | 6/2001 | Norton .......................... 705/18 |
| 7,070,092 | B2 * | 7/2006 | Phillips et al. ............... 235/379 |
| 7,155,409 | B1 * | 12/2006 | Stroh ............................ 705/37 |
| 2002/0178112 | A1 * | 11/2002 | Goeller et al. ................. 705/39 |
| 2005/0018896 | A1 * | 1/2005 | Heit et al. ..................... 382/137 |
| 2005/0087594 | A1 * | 4/2005 | Phillips et al. ............... 235/379 |
| 2005/0087595 | A1 * | 4/2005 | Phillips et al. ............... 235/379 |
| 2005/0091117 | A1 * | 4/2005 | Phillips et al. ................. 705/24 |
| 2005/0097046 | A1 * | 5/2005 | Singfield ....................... 705/42 |
| 2006/0015428 | A1 * | 1/2006 | Friedman ....................... 705/35 |
| 2006/0106717 | A1 * | 5/2006 | Randle et al. .................. 705/45 |

OTHER PUBLICATIONS

"Alliances Key in New Processing Environment", Item Processing Report. Potomac: Jul. 15, 2004. vol. 15. Iss. 14; p. 1.*
"Wells Fargo Announces Rollout of Visa POS Check Program", PR Newswire. New York: Jul. 14, 2003; p. 1.*
"U.S. Bank Expands Partnership with Solutran to Include Return Item Management for Check Conversion and Image Deposit", Business Wire. New York: Mar. 17, 2004. p. 1.*
"EZCheck partners with RDM Corporation", Canada Newswire. Ottawa: Jul. 19, 2004. p. 1.*

* cited by examiner

*Primary Examiner*—James P Trammell
*Assistant Examiner*—Mohammad Z Shaikh
(74) *Attorney, Agent, or Firm*—Mark E. Scott; Conley Rose, P.C.

(57) ABSTRACT

A method and system of check presentation. At least some of the illustrative embodiments are methods comprising accepting a first paper check and a second paper check in exchange for a good or service (the second paper check postdated), converting the first paper check and the second paper check into a first electronic request and a second electronic request respectively, presenting the first electronic request for payment through a funds transfer network, electronically storing the second electronic request, and then presenting the second electronic request for payment through the funds transfer network on the postdated date.

21 Claims, 2 Drawing Sheets

METHOD AND SYSTEM OF CHECK PRESENTATION

BACKGROUND

Many merchants implement in-house financing (e.g., 90 days same as cash) by taking a series of checks from the customer, depositing the first check on the day of purchase, and holding the remaining checks until the agreed upon dates for further payments. When each agreed upon date arrives, the merchant deposits each check. There are several shortcomings to such a system. One such shortcoming is that if the checks are all dated the day of the original purchase, the checks deposited near the end of the term (e.g., the third month's check) may be "stale" and therefore refused by a bank. Another shortcoming is that it is a labor intensive process for the merchant to safeguard, identify and deposit the checks on the particular agreed-upon days.

SUMMARY

The problems noted above are solved in large part by a method and system of check presentation. At least some of the illustrative embodiments are methods comprising accepting a first paper check and a second paper check in exchange for a good or service (the second paper check postdated), converting the first paper check and the second paper check into a first electronic request and a second electronic request respectively, presenting the first electronic request for payment through a funds transfer network, electronically storing the second electronic request, and then presenting the second electronic request for payment through the funds transfer network on the postdated date.

Other illustrative embodiments are systems comprising a point of sale (POS) device configured to accept data regarding a first paper check and a second paper check (the second paper check postdated and the first and second paper checks in payment for the same purchase), and a computer system configured to couple to the POS device (the computer system also configured to couple to a funds transfer network). The POS device creates a digital image of a first paper check, and communicates the digital image to the computer system (and wherein the POS device creates a digital image of a second paper check and communicates the digital image and the postdated date to the computer system). The computer system is configured to present a transaction represented by the first paper check as an electronic debit through the funds transfer network, and wherein the computer system is configured to store the digital image of the second paper check and present a transaction represented by the second paper check as an electronic debit through the funds transfer network on the postdated date.

Yet still other illustrative embodiments are methods comprising receiving a digital image of a current dated check, receiving a digital image of a postdated check along with a postdated date (the current dated check and postdated check payment for a purchase), presenting a first electronic request representing the current dated check (the presenting to an electronic funds transfer network), and presenting a second electronic representing the postdated check (the presenting to the electronic funds transfer network and proximate in time to the postdated date).

Finally, other illustrative embodiments are a computer readable media storing a computer program that, when executed by a processor, performs a method comprising receiving a digital image of a current dated check, receiving a digital image of a postdated check along with a postdated date (the current dated check and postdated check payment for a purchase), presenting a first electronic request representing the current dated check, the presenting to an electronic funds transfer network, and presenting a second electronic representing the postdated check, the presenting to the electronic funds transfer network and proximate in time to the postdated date.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either a direct or indirect electrical or optical connection. Thus, if a first device couples to a second device, that connection may be through a direct connection, through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
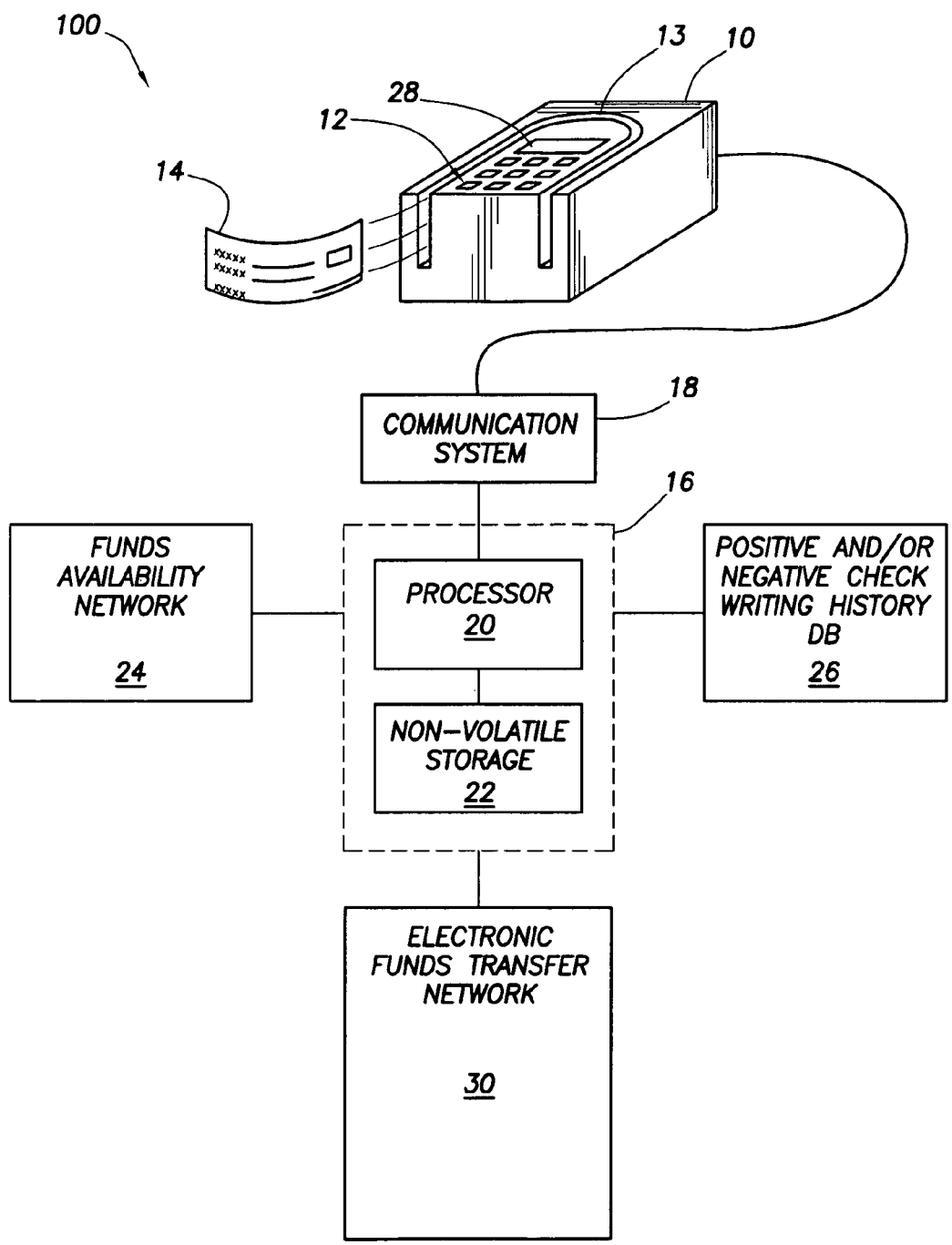
FIG. 1 shows a system in accordance with the embodiments of the invention.

FIG. 1 illustrates a system 100 in accordance with the embodiments of the invention. In particular, system 100 comprises a Point Of Sale (POS) terminal 10. A POS terminal 10 has a keypad 12 for entry of pertinent information and also has a check scanner 13. The check scanner 13 allows the POS terminal 10 to read the magnetic ink character recognition (MICR) line of check 14, and in some embodiments allows the POS terminal 10 to make a digital image of check 14. Although there may be merchants who have only a single POS terminal 10, in alternative embodiments a merchant may have a plurality of POS terminals at each location. The POS terminal 10 may be, for example, a NURIT terminal available from Lipman USA of Syosset, N.Y.

The illustrative POS terminal 10 couples to a computer system 16 by way of a communication system 18. In some embodiments, POS terminal 10 is remotely located from the illustrative computer system 16, and therefore the communication system 18 may take many forms. In some embodiments the communication system 18 may be a voice-based telephone system, and in these embodiments the POS terminal 10 thus has the capability to act as a telephone modem. In alternative embodiments, the POS terminal 10 may couple to the computer 16 by way of a dedicated digital communication system (e.g., a dedicated T1 line). In yet still other embodiments, the POS terminal 10 may be coupled to the computer system 16 by way of the communication network 18 being: an Internet connection; a satellite connection; a radio-based connection; a cellular telephone based system; or a combination these.

Regardless of the precise nature of the communication system 18, the POS terminal 10 and computer system 16 communicate regarding potential purchases by a consumer. In particular, when a consumer proposes to purchase a good or service and to pay for that good or service by way of a paper check 14, the merchant uses the POS terminal 10 to provide information to the computer system 16 to obtain an indication of whether the check should be accepted by the merchant. For example, the merchant may use the POS terminal 10 to provide information to the computer system 16 such as: the name of the person writing the check; the account number of the check; the check number of the check; and/or the driver's license number of the person writing the check. Regardless of the precise information provided from the POS terminal 10 to the computer system 16, the information may be entered by way of the keypad 12 and/or the determined by scanning the check through the check scanner 13.

Still referring to FIG. 1, the computer system 16, which may comprise a processor 20 coupled to a non-volatile storage device 22, may perform a verification process with respect to the check and/or the check writer. In some embodiments, the computer system 16 provides some or all of the data regarding the check 14 and/or the check writer to a funds availability network 24. As the name implies, a funds availability network has the ability to electronically access current account balances and provide an indication of whether there are sufficient funds in the account to cover the proposed check. In accordance with at least some embodiments, the funds availability network 24 may be the Visa Network, which allows subscribers to check available balances as part of a check verification procedure. Other funds availability networks may be equivalently used.

In addition to, or in place of, checking for funds availability by way of a funds availability network 24, in the process of verifying the check the computer system 16 may also access a positive and/or negative check writing history database 26. The database 26 contains information about the check writing history of the person writing the check and/or the account upon which the check is drawn. As the name implies, that history might be positive (indicating a substantially long string of checks where there were sufficient funds to cover checks), and may also contain negative history (an indication of how many checks were written that were returned for insufficient funds). Thus, the positive/negative history information is returned to the computer system 16 for analysis. In accordance with at least some embodiments, the history database 26 is the National Check Network, a subsidiary of the Electronic Clearing House, Inc. of Camarillo, Calif. Other history services may be equivalently used.

In addition to or in place of funds verification and checking the history, the computer system 16 may itself maintain records regarding the person writing the check or the account on which the check is drawn. Using some or all of the gathered information, the computer system 16 sends an indication to the POS terminal 10 of whether the check 14 should be accepted. In some embodiments, the indication that the check should be accepted is displayed on a display device 28 of the POS terminal 10. However, other methods of giving an indication of whether the check should be accepted may be equivalently used.

The indication of whether to accept the check sent from the computer system 16 to the POS terminal 10 may mean different things in different embodiments. In some embodiments, the merchant using the POS terminal 10 may subscribe to a system that merely provides a recommendation on whether the check should be accepted. In alternative embodiments, the merchant using the POS terminal 10 may subscribe to a system where the check is guaranteed. In these embodiments, when the computer system 16 sends the indication that the check should be accepted, this indication also signifies that the company providing the service represented by computer system 16 guarantees payment of the check to the merchant, thus relieving the merchant of the possibility of the check being returned for insufficient funds.

Still referring to FIG. 1, in addition to being a mechanism by which a merchant makes a determination as to whether to accept a check, the POS terminal 10 and computer system 16 also act together to be mechanism by which funds are transferred with respect to the check. In particular, many companies have developed services which transfer funds between the accounts of a payee and the payor. In order to utilize these services, banking laws have been amended to allow the conversion or "truncation" of a check into an electronic transaction (also known as an electronic debit) such that the paper check itself never need be presented to the bank on which it is drawn. In accordance with the embodiments of the invention, the computer system 16 and the POS terminal 10 work together to initiate electronic funds transfer with respect to the paper checks. Considering for purposes of example the illustrative check 14, as part of a check verification and/or guarantee process discussed above the merchant scans the check 14 to one or more of: read the account number and check number of the check; and/or produce a digital image of the check. Moreover, the POS terminal 10 accepts data related to the check writer (e.g., driver's license number of the check writer) and to the check itself (e.g., the amount). This information is then transferred though the communication system 18 to the computer system 16 which performs the verification and/or guarantee process. If the check is ultimately accepted, the computer system 16 converts or truncates the check into an electronic debit, and presents the check for payment to an electronic funds transfer network 30. In some embodiments, the electronic funds transfer network 30 may be a transfer system governed by the National Automated Clearing House Association (NACHA). Such a network 30 facilitates the transfer of funds electronically from the payor (check writer) to the payee (merchant). While FIG. 1 shows three separate entities implementing the funds availability network 34, the check writing history database 26 and the electronic funds transfer network 30, in some embodiments these services may in whole or in part be provided by way of a single service provider.

In accordance with the embodiments of the invention, the illustrative hardware as discussed in FIG. 1 may be used to perform in-house financing by the merchant based on the customer providing a plurality of checks for the purchase of an item. However, rather than the merchant having to store the physical checks and deposit them at some future date, the illustrative system of FIG. 1, and in particular the computer system 16, is charged with electronically storing and later presenting those checks.

Figure 2:
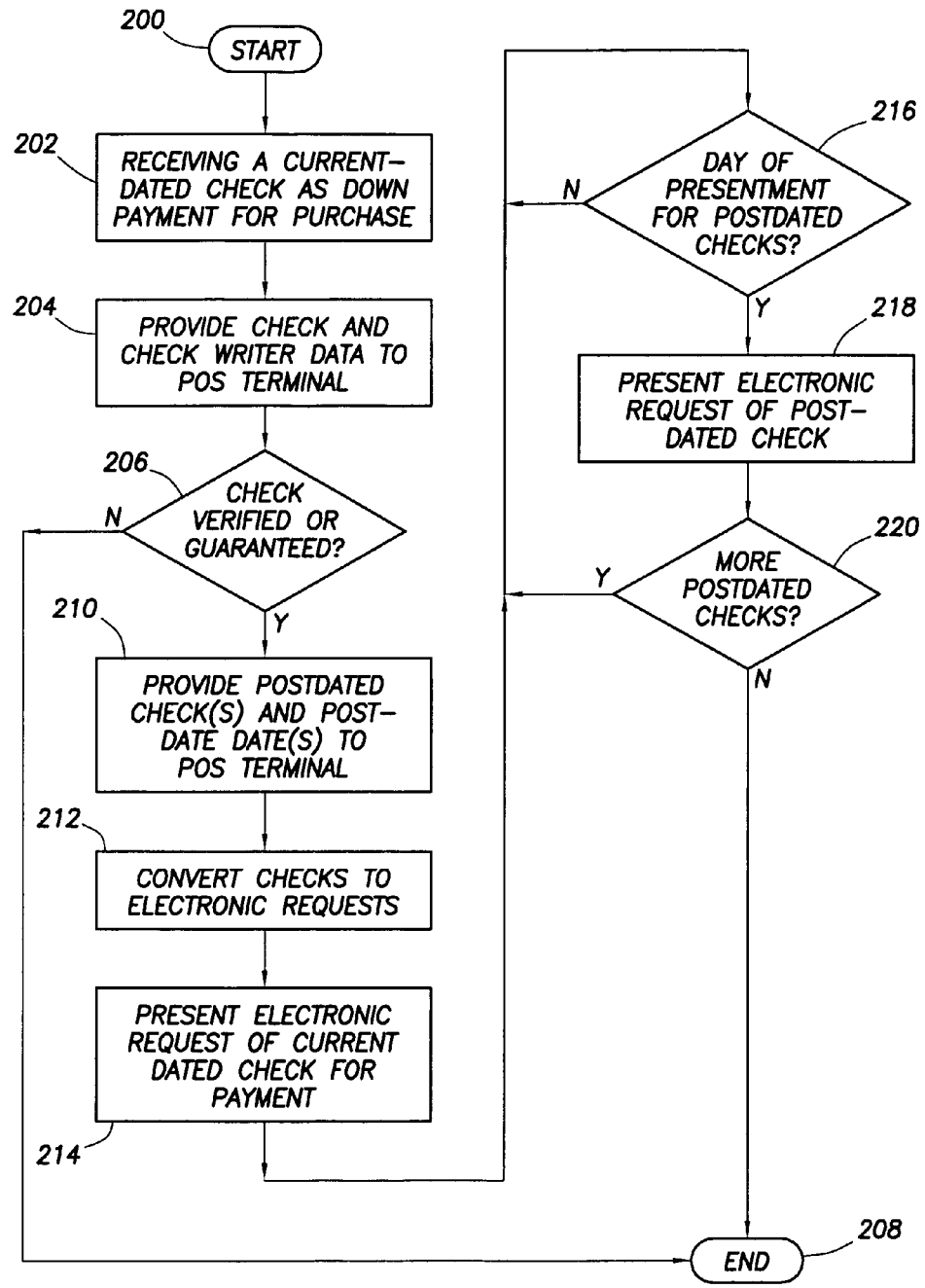
FIG. 2 shows a method in accordance with the embodiments of the invention.

FIG. 2 illustrates a method in accordance with the embodiments of the invention. The steps of FIG. 2 are merely illustrative and many of the steps may be equivalently combined, separated, or performed in a different order. In particular, the process starts (block 200) and moves to receiving a current-dated check as down payment for a purchase (block 202). The check is then provided, along with other information, to the POS terminal 10 (block 204). In some embodiments, these illustrative steps may be implemented by scanning the check through the POS terminal 10 to read the account number and check number and providing information about the check writer by way of the keypad 12 (e.g., a driver's license number).

Still referring to FIG. 2, next is a determination whether the check is verified or guaranteed (block 206). As discussed above, the verification and/or guarantee may come from the computer system 16 after checking for funds availability, positive and/or negative check writing history and other sources of information available to the computer system 16. If the computer system 16 indicates that the check should not be accepted, the process ends (block 208). If, on the other hand, the computer system 16 indicates that the check should be accepted, then one or more postdated checks are also provided to the POS terminal 10 (block 210). Much like providing the information for the current-dated check, providing the information for the one or more postdated checks in some embodiments involves using the keypad 12 to provide the amount of the check, and scanning the check through the POS terminal 10 to read the MICR information and/or to create a digital image of the check. However, the one or more postdated checks in accordance with the embodiments of the invention will not be presented for payment until the postdated date. For this reason, and in most cases, a funds availability check for the postdated checks would be futile. In accordance with the embodiments of the invention, if the current-dated check (for which information was provided to the computer system 16 at block 204) was indicated to be acceptable by the computer system 16, then the entire transaction (including the postdated checks) is accepted. Another consideration arising from the fact that the postdated checks will not be presented until the postdated date is that the date of presentation is a valuable piece of information in implementing the method. Thus, in accordance with the embodiments of the invention, the merchant also keys in a future date by way of the keypad 12 (the future date being the postdated date of the check). On currently existing terminals, the future date for presentation is may be provided by way of the "other data" field; however, the future POS terminals may be programmed to specifically query for future date data.

Still referring to FIG. 2, the computer system 16 then converts all the checks to electronic requests (block 212), such as electronic debits created from the conversion or truncation of the paper check, and stores them in the non-volatile storage 22. Thereafter, the computer system 16 presents the electronic request of the current-dated check for payment (block 214). As discussed with respect to FIG. 1, this presentation may be to the electronic funds transfer network 30. Moreover, inasmuch as the current-dated check is for a contemporaneous purchase, the electronic presentation is coded to the electronic funds network as a Point Of Purchase (POP) transaction. Coding the electronic request as a POP transaction indicates that in the event of a dispute of any kind, part of the paper trail evidencing the transaction will include a receipt for the good or service.

The next step in the illustrative method of FIG. 2 is a determination of whether the day of presentation for the postdated checks has arrived (block 216). If not, the illustrative method waits until the date matches the date of one of the postdated checks. Waiting in the loop illustrated by decision block 216 does not necessarily mean that a program executed on processor 20 of computer system 16 waits in a software loop until the appropriate day; rather, this step may be implemented by having a program executed on the processor 20 scan through records stored on a non-volatile storage device 22 on a daily basis searching for records containing electronic requests that should be presented on the current date. If a check is found whose postdated date is that of the current date (block 216), the illustrative computer system 16 presents the electronic request represented by that postdated check to the electronic funds transfer network 30 (block 218). In accordance with at least some embodiments, the electronic requests representative of the postdated checks, are, by definition, on a day different than the actual transaction where the good or services were exchanged and where there was a paper receipt bearing the date of the transaction. For this reason, the electronic requests representative of the postdated checks are each coded as Accounts Receivable Conversion (ARC) transactions to the electronic funds transfer network 30. Thus, in the event of a dispute regarding a transaction, the electronic request is indicative of the fact that the funds transfer is similar to an account receivable transaction in spite of the fact that, from a consumers standpoint, the plurality of checks were written contemporaneous with the actual transaction.

In alternative embodiments, a consumer may not provide all the checks representing the total purchase price of the goods or services at the initial transaction. Instead, the consumer may provide the merchant checks at a later date. The merchant still gets the benefits of the system, because as soon as the checks arrive they may be scanned in through the POS terminal 10, along with the date the check should actually be presented for payment, thus relieving the merchant of the related art need of having to keep track of the paper checks and deposit those paper checks at some future date.

Finally, a decision is made as to whether there are more postdated checks with respect to the transaction (block 220). If there are no further postdated checks in the transaction, the process simply ends (block 208). If, on the other hand, there are further postdated checks for presentation in the transaction, the illustrative method retreats to determining whether the current date is the day of presentation for the postdated checks (block 216).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:

accepting, by a merchant, a first paper check and a second paper check in exchange for a good or service, the second paper check postdated;

converting the first paper check and the second paper check into a first electronic request and a second electronic request respectively;

presenting the first electronic request for payment through a funds transfer network such that the merchant receives a first portion of funds contemporaneously with the exchange for the good or service;

electronically storing the second electronic request for a period of time beginning at conversion of the first and second paper checks to electronic requests; and then presenting the second electronic request for payment through the funds transfer network on the postdated date such that the merchant receives a second portion of funds.

2. The method as defined in claim 1 further comprising, prior to the accepting, performing a check verification with respect to the first paper check.

3. The method as defined in claim 2 wherein performing a check verification further comprises accessing a database comprising information on one or more selected from the group: the person writing the check; the account number of the check; and history of checks written on the account returned for insufficient funds.

4. The method as defined in claim 1 wherein converting further comprises:
creating a digital image of the first paper check; and
creating a digital image of the second paper check, and associating with the digital image of the second paper check the postdated date.

5. The method as defined in claim 1 wherein presenting in each case further comprises presenting through the Automated Clearing House network.

6. The method as defined in claim 1 further comprising:
wherein presenting the first electronic request further comprises presenting the first electronic request as a point of purchase transaction; and
wherein presenting the second electronic request further comprises present the second electronic request as an accounts receivable conversion transaction.

7. A system comprising:
a point of sale (POS) device configured to accept data regarding a first paper check and a second paper check, the second paper check postdated and the first and second paper checks in payment for the same purchase; and
a computer system configured to couple to the POS device, the computer system also configured to couple to a funds transfer network;
wherein the POS device creates a digital image of a first paper check, and communicates the digital image to the computer system contemporaneously with the purchase, and wherein the POS device creates a digital image of a second paper check and communicates the digital image and the postdated date to the computer system contemporaneously with the purchase;
wherein the computer system is configured to present a transaction represented by the first paper check as an electronic debit through the funds transfer network, and wherein the computer system is configured to store the digital image of the second paper check until at least the postdated date and then present a transaction represented by the second paper check as an electronic debit through the funds transfer network on the postdated date.

8. The system as defined in claim 7 wherein the POS device couples to the computer system by one or more selected from the group: a telephone modem; an Internet connection; a dedicated connection over a telephone network; a satellite connection.

9. The system as defined in claim 7 wherein the computer system is further configured to send to the POS device an indication of whether the first paper check should be accepted.

10. The system as defined in claim 7 wherein the computer system further comprises a processor and a long term digital data storage device, wherein the computer system stores the digital image of the second paper check in the long term storage device.

11. The system as defined in claim 7 wherein the computer system is further configured to present the transaction represented by the first paper check to the funds transfer network as a point of purchase transaction, and wherein the computer system is configured to present the transaction represented by the second paper check to the funds transfer network as an accounts receivable conversion transaction.

12. A method comprising:
receiving, from a merchant over a communication system, a digital image of a current dated check;
receiving, from a merchant over the communication system, a digital image of a postdated check along with and a postdated date, the current dated check and postdated check payment for a for goods or services at a time of purchase;
presenting a first electronic request representing the current dated check, the presenting to an electronic funds transfer network such that the merchant receives a first portion of funds;
storing the digital image of the postdated check received from the merchant, the storing from proximate to the time of the of purchase until proximate to the postdated date; and
presenting a second electronic request representing the postdated check, the presenting to the electronic funds transfer network such that the merchant receives a second portion of funds different than the first portion.

13. The method as defined in claim 12 further comprising, prior to presenting:
analyzing information related to the current dated check, at least some of the information related only to the first dated check; and
sending approval to accept the both the current dated check and the post dated check.

14. The method as defined in claim 13 wherein analyzing further comprises accessing third party database services.

15. The method as defined in claim 13 wherein analyzing further comprising analyzing using a check number and a draft amount of the current dated check.

16. The method as defined in claim 12 further comprising:
wherein presenting the first electronic request further comprises presenting the first electronic request as a point of purchase transaction; and
wherein presenting the second electronic request further comprises present the second electronic request as an accounts receivable conversion transaction.

17. A computer readable storage media storing a computer program that, when executed by a processor, causes the processor to:
receive a digital image of a current dated check over a communication system;
receive a digital image of a postdated check along with a postdated date over the communication system, the current dated check and postdated check payment at a time of purchase;
present, proximate in time to the time of purchase, a first electronic request representing the current dated check to an electronic funds transfer network;
present a second electronic request representing the postdated check to the electronic funds transfer network and proximate in time to the postdated date.

18. The computer readable storage media as defined in claim 17 further causes the processor to:
analyze information related to the current dated check, at least some of the information related only to the first dated check; and
send approval to accept the both the current dated check and the post dated check.

19. The computer readable storage media as defined in claim 18 further causes the processor to access third party database services.

20. The computer readable storage media as defined in claim 18 wherein when the processor analyzes, the program causes the processor to analyze using a check number and a draft amount of the current dated check.

21. The computer readable storage media as defined in claim 17:
  wherein when the processor presents the first electronic request, the program causes the processor to present the first electronic request as a point of purchase transaction; and
  wherein when the processor presents the second electronic request, the program causes the processor to present the second electronic request as an accounts receivable conversion transaction.

* * * * *